US012283415B2

(12) United States Patent
Pi et al.

(10) Patent No.: US 12,283,415 B2
(45) Date of Patent: Apr. 22, 2025

(54) METHOD FOR COATING MAGNETIC POWDER CORE WITH SODIUM SILICATE

(71) Applicants: JIANGXI EVERTECH NEW MATERIAL CO., LTD., Jiangxi (CN); JIANGXI EVERTECH HOLDING CO., LTD., Jiangxi (CN)

(72) Inventors: Jinbin Pi, Yichun (CN); Miantuan Zhang, Yichun (CN); Shenghua Mao, Yichun (CN); Junjie Chen, Yichun (CN); Yuyuan Wen, Yichun (CN); Xin Jin, Yichun (CN)

(73) Assignees: JIANGXI EVERTECH NEW MATERIAL CO., LTD., Jiangxi (CN); JIANGXI EVERTECH HOLDING CO., LTD., Jiangxi (CN)

( * ) Notice: Subject to any disclaimer, the term of this patent is extended or adjusted under 35 U.S.C. 154(b) by 800 days.

(21) Appl. No.: 17/608,506

(22) PCT Filed: Apr. 27, 2021

(86) PCT No.: PCT/CN2021/090150
§ 371 (c)(1),
(2) Date: Nov. 3, 2021

(87) PCT Pub. No.: WO2022/062394
PCT Pub. Date: Mar. 31, 2022

(65) Prior Publication Data

US 2022/0415571 A1 Dec. 29, 2022

(30) Foreign Application Priority Data

Sep. 23, 2020 (CN) ......................... 202011010514.7

(51) Int. Cl.
*H01F 41/02* (2006.01)
*B22F 1/14* (2022.01)
(Continued)

(52) U.S. Cl.
CPC ............ *H01F 41/0246* (2013.01); *B22F 1/14* (2022.01); *B22F 3/02* (2013.01); *B22F 3/24* (2013.01);
(Continued)

(58) Field of Classification Search
CPC ............. H01F 41/0246; H01F 1/24–26; B22F 1/102–18
See application file for complete search history.

(56) References Cited

U.S. PATENT DOCUMENTS 10,898,950 B2 * 1/2021 Saito ......................... B22F 3/00
2022/0359109 A1 * 11/2022 Ke ............................ B22F 1/08

FOREIGN PATENT DOCUMENTS

CN 111029124 A * 4/2020
GB 1298638 A * 12/1972 ........... H01F 1/1475
(Continued)

*Primary Examiner* — Brian D Walck
*Assistant Examiner* — Austin Pollock
(74) *Attorney, Agent, or Firm* — WHDA, LLP

(57) ABSTRACT

The present disclosure discloses a method for coating a magnetic powder core with sodium silicate, including: using polyoxyethylene laurylether phosphate as a dispersant for sodium silicate and lignosulfonate as a dispersant for a metal magnetic powder, mixing a dispersed sodium silicate solution and a dispersed metal magnetic powder, coating the dispersed metal magnetic powder, and drying: adding an insulating adhesive and a lubricant, subjecting the resulting mixture to a compression molding, and finally, carrying out a high-temperature annealing treatment to obtain a sodium silicate coated magnetic powder core.

8 Claims, 3 Drawing Sheets

(51) Int. Cl.
*B22F 3/02* (2006.01)
*B22F 3/24* (2006.01)
*H01F 1/24* (2006.01)

(52) U.S. Cl.
CPC .......... *H01F 1/24* (2013.01); *B22F 2003/023* (2013.01); *B22F 2003/248* (2013.01); *B22F 2301/35* (2013.01); *B22F 2302/45* (2013.01)

(56) References Cited

FOREIGN PATENT DOCUMENTS

JP 06287606 A * 10/1994
KR 2000012826 A * 3/2000 ............ B22F 1/0085

* cited by examiner

METHOD FOR COATING MAGNETIC POWDER CORE WITH SODIUM SILICATE

CROSS REFERENCE TO RELATED APPLICATION(S)

The present application claims the priority of Chinese Patent Application No. 202011010514.7 entitled "Method for coating magnetic powder core with sodium silicate" filed on Sep. 23, 2020, in the China National Intellectual Property Administration, the entire contents of which are incorporated herein by reference.

TECHNICAL FIELD

The present disclosure relates to the technical field of preparation of magnetic powder core, and in particular to a method for coating a magnetic powder core with sodium silicate.

BACKGROUND ART

Magnetic mateiials are widely used in the fields of electronics, computer and communication, and have radically changed our life nowadays. At present, due to the fact that magnetic particle cores have the advantages of relatively high magnetic flux density, good temperature stability and mechanical impact adaptability, they are widely used in micro-motors, inductive devices, fast drives and pulse transformers in fields such as aviation, automobile, and household appliances. However, conventional magnetic materials such as silicon-steel laminations also have some drawbacks during use. Under high frequency conditions, conventional soft magnetic materials such as silicon-steel laminations increase the energy loss due to the rapid rise of eddy currents, which increases the temperature of the motor and reduces the efficiency thereof. Based on the principle that reducing this eddy current phenomenon could improve the energy efficiency of soft magnetic materials, it is urgent to develop a new type of green and energy-saving soil magnetic material as the movement of electric equipment. Moreover, with the development of electronic components and electronic equipment, electrical appliances are becoming more and more integrated and miniaturized, which requires magnetic materials to have higher permeability and smaller losses.

In the conventional coating process, phosphoric acid is generally used as an insulating material, and an organic material is added as an adhesive, in which the powder particles have uneven coating on their surfaces and relatively large losses, and proportion of non-magnetic materials is greatly reduced, which results in poor DC bias performance. Furthermore, when used in an outdoor environment with a large change in temperature or humidity, the added organic adhesive easily becomes aged and has poor weatherability.

SUMMARY

In order to address the problems of uneven coating, relatively large losses, poor DC (direct-current) bias performance, organic adhesives being easily aged and having poor weatherability existing in the above conventional process for preparing a magnetic powder core by using phosphoric acid for coating and organic material as adhesives, the present disclosure provides a method for coating a magnetic powder core with sodium silicate.

The technical solution of the disclosure is realized as follows.

A method for coating a magnetic powder core with sodium silicate, including:

- step 1, pretreatment of sodium silicate: mixing sodium silicate and deionized water in a ratio of 1: (1-5), adding polyoxyethylene laurylether phosphate, and mixing uniformly to obtain a sodium silicate solution, wherein the polyoxyethylene laurylether phosphate serves to uniformly disperse the sodium silicate in an aqueous solution, and could also simultaneously play a role of antirust to prevent the metal magnetic powder from rusting;
- step 2, pretreatment of a metal magnetic powder: adding the metal magnetic powder to a coating furnace, setting the coating furnace at a temperature of 60-80° C., adding lignosulfonate thereto after reaching the set temperature, and stirring for 10-30 minutes, wherein the lignosulfonate serves to uniformly disperse the metal magnetic powder;
- step 3, coating: adding the sodium silicate solution obtained in step 1 to the metal magnetic powder obtained in step 2, and stirring for 10-30 minutes, wherein the sodium silicate solution is added in an amount of 1-10 wt % of the metal magnetic powder;
- step 4, baking: baking the powder obtained in step 3 at a temperature 120-150° C. for 60-120 minutes to obtain a coated powder:
- step 5, adding an insulating adhesive and a lubricant: adding an inorganic insulating adhesive in an amount of 0.1%-1% by weight of the coated powder and a stearate lubricant in an amount of 0.1%-1 by weight of the coated powder to the coated powder obtained in step 4, and mixing uniformly;
- step 6, compression molding: subjecting the magnetic powder mixed uniformly in step 5 to a compression molding at a molding pressure of 1500-2300 MPa; and
- step 7, heat treatment: keeping the magnetic powder core molded in step 6 under the protection of a $N_2$ or $H_2$ atmosphere at a temperature of 600-800° C. for 30-90 minutes to obtain a sodium silicate coated magnetic powder core.

In some embodiments, in step 1, the polyoxyethylene laurylether phosphate is added in an amount of 0.1-3 wt % of the sodium silicate.

In some embodiments, in step 2, the lignosulfonate is added in an amount of 0.1-1 wt. % of the metal magnetic powder.

In some embodiments, the metal magnetic powder is one or more selected from the group consisting of pure Fe, FeSi, FeSiAl, FeSiNi, FeNi, FeNiMo, and FeSiCr, and has an average particle size of 10-200 μm.

In some embodiments, the insulating adhesive added in step 5 is an inorganic material.

In some embodiments, the insulating adhesive added in step 5 is one or more selected from the group consisting of silicon dioxide, aluminum oxide, and calcium oxide, and has a particle size of 10 μm or less.

In some embodiments, in step 5, the stearate is one or more selected from the group consisting of zinc stearate, aluminum stearate, and lithium stearate.

In some embodiments, a shape formed by the compression molding in step 6 is one of annular, E-shaped, and U-shaped.

In some embodiments, in step 3, the amount of the sodium silicate solution added is replaced by 20 wt % of the metal magnetic powder.

In some embodiments, step 6 further includes chamfering after the compression molding.

Compared with the prior art, the present disclosure has the following beneficial effects:

(1) The polyoxyethylene laurylether phosphate is added as a dispersant to uniformly disperse the sodium silicate, and the lignosulfonate is added as a dispersant to uniformly disperse the metal magnetic powder. Under the conditions that the two different dispersants are stirred together, they may play a synergistic dispersion effect, so that the sodium silicate is more uniformly dispersed and coated on the surface of the metal magnetic powder particles.

(2) The used coating adhesion materials are inorganic materials such as sodium silicate, silicon dioxide, aluminum oxide and calcium oxide, which greatly improves the weatherability and reduces the cost compared with the conventional organic materials.

(3) The loss of the magnetic particle core prepared in the present disclosure may be reduced by not less than 15% (50 KHz, 100 MT) on the basis of products obtained by conventional processes, and the ratio of the permeability under 100 Oe DC bias magnetic field to initial permeability may be increased by not less than 2% on the basis of products obtained by conventional processes.

(4) The preparation device used in the present disclosure is simple, easy to operate, and low in cost, and is particularly suitable for large-scale industrialized production.

DETAILED DESCRIPTION OF THE EMBODIMENTS

Figure 1:
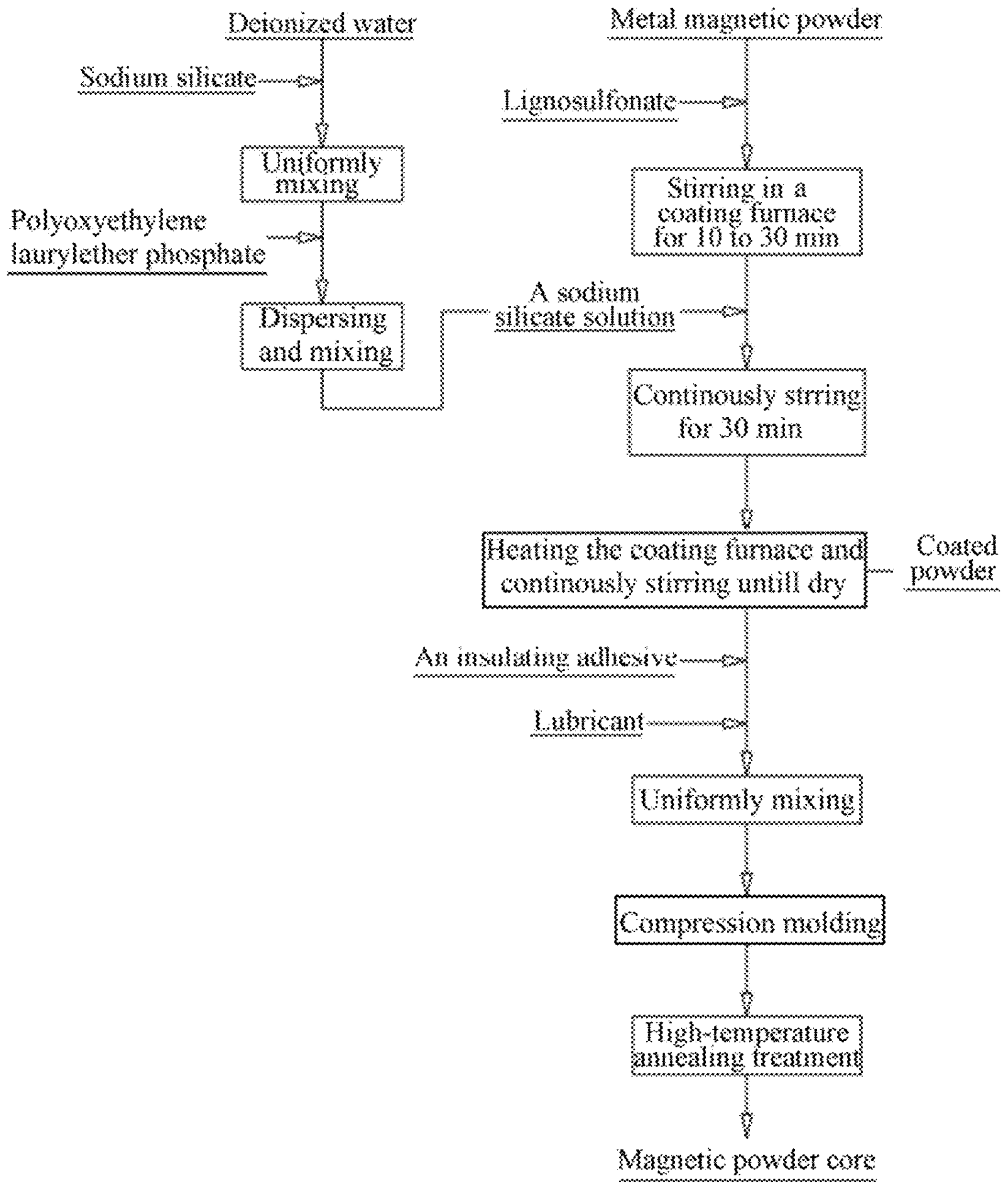
FIG. 1 shows a flow chart of a coating process according to an example of the present disclosure.
Figure 2:
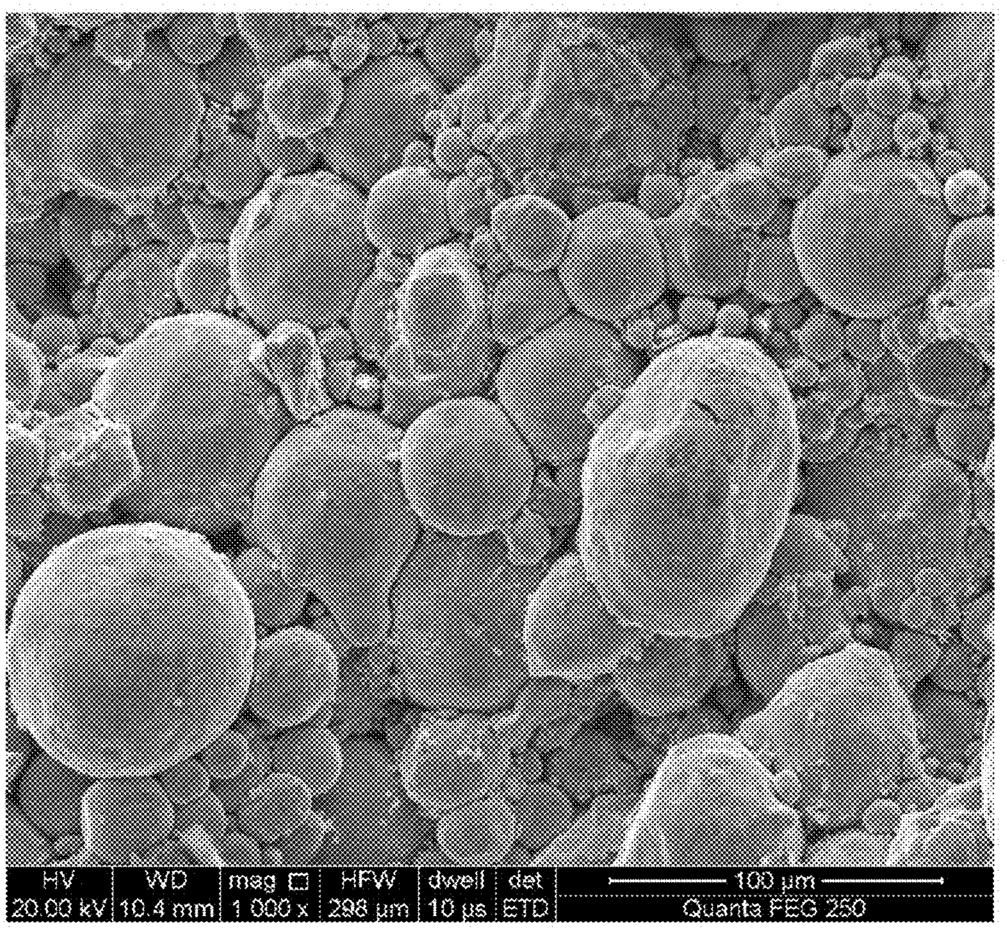
FIG. 2 is a scanning electron microscope (SEM) image of the sodium silicate coated magnetic powder core according to the present disclosure after an annealing treatment.
Figure 3:
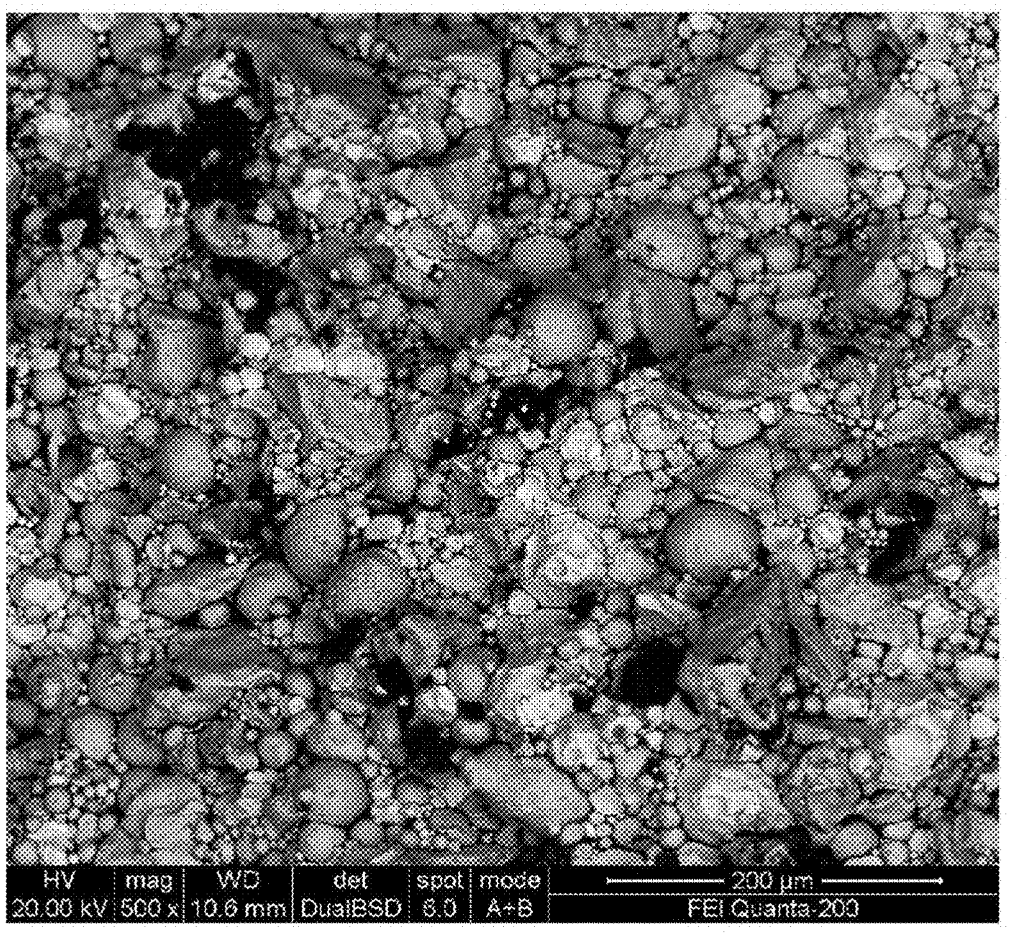
FIG. 3 is a SEM image of the magnetic particle core coated by a conventional process in which an organic adhesive and phosphoric acid are used after an annealing treatment.

The present disclosure is further described below in combination with drawings and specific examples, but the protection scope of the present disclosure is not limited thereto.

Example 1

10 g of sodium silicate and 10 g of deionized water were weighed and mixed uniformly and 0.01 g of polyoxyethylene laurylether phosphate was added thereto, and then mixed uniformly, obtaining a sodium silicate solution, in which the polyoxyethylene laurylether phosphate serves to uniformly disperse sodium silicate in an aqueous solution, and could also simultaneously play a role of antirust to prevent the metal magnetic powder from rusting. 1000 g of air-atomized sendust powder with an average particle size of 30 μm was weighed and placed into a coating furnace. The coating furnace was heated to 60° C., and then 1 g of lignosulfonate was added thereto and stirred for 20 minutes, wherein the lignosulfonate serves to uniformly disperse the metal magnetic powder. The sodium silicate solution was added to the metal magnetic powder and stirred for 10-30 minutes, obtaining a mixture. The coating furnace was then heated to 120° C., and the mixture was baked for 120 minutes, obtaining a coated powder: Then, aluminum oxide in an amount of 0.1% by weight of the coated powder and zinc stearate lubricant in an amount of 0.1% by weight of the coated powder were added to the coated powder, and they were mixed uniformly. The uniformly mixed magnetic powder was molded into a 27×φ14.7×11 annular magnetic powder core at a molding pressure of 1500 MPa, and chamfered. The magnetic powder core was kept at 600° C. under the protection of $N_2$ atmosphere for 30 minutes, obtaining a sodium silicate coated magnetic powder core.

Example 2

40 g of sodium silicate and 40 g of deionized water were weighed and mixed uniformly, and 1.2 g of polyoxyethylene laurylether phosphate was added thereto, and then mixed uniformly, obtaining a sodium silicate solution, in which the polyoxyethylene laurylether phosphate serves to uniformly disperse sodium silicate in an aqueous solution, and could also simultaneously play a role of antirust to prevent the metal magnetic powder from rusting. 1000 g of air-atomized sendust powder with an average particle size of 32 μm was weighed and placed into a coating furnace. The coating furnace was heated to 80° C., and 5 g of lignosulfonate was then added thereto and stirred for 30 minutes, wherein the lignosulfonate serves to uniformly disperse the metal magnetic powder. The sodium silicate solution was added to the metal magnetic powder and stirred for 30 minutes, obtaining a mixture. The coating furnace was then heated to 120° C., and the mixture was baked for 120 minutes, obtaining a coated powder. Then, aluminum oxide in an amount of 0.5% by weight of the coated powder and zinc stearate lubricant in an amount of 0.8% by weight of the coated powder were added to the coated powder, and they were mixed uniformly. The uniformly mixed magnetic powder was molded into a φ27×φ14.7×11 annular magnetic powder core at a molding pressure of 2000 MPa, and chamfered. The magnetic powder core was kept at 700° C. under the protection of $N_2$ atmosphere for 90 minutes, obtaining a sodium silicate coated magnetic powder core.

Comparative Example 1

An aerosolized FeSiAl ring magnetic powder core (φ27×φ14.7×11) prepared by a conventional coating process using an organic adhesive and phosphoric acid was used as a standard product with a permeability of 90.

Comparative Example 2

An aerosolized FeSiAl ring magnetic powder core (φ27×φ14.7×11) prepared by a conventional coating process using an organic adhesive and phosphoric acid was used as a standard product with a permeability of 75.

Performance Test

The annular magnetic powder cores obtained in Examples 1 to 2 and Comparative Examples 1 to 2 were subjected to winding test, using φ0.7 mm copper wire with 35 turns, in which the instrument for testing inductance was TH2816B, the instrument for testing loss was VR152, and the instrument for testing the DC bias performance was CHROMA3302+1320. The obtained results are shown in Table 1.

TABLE 1

Magnetic test results of Examples 1 to 2 and Comparative Examples 1 to 2

| | Inductance (μH)/ 100 kHZ, 1 V, 25 Ts | Perme-ability | Core losses (50 kHz/ 100 mT) | DC bias performance (Ratio of permeability under 100Oe DC bias magnetic field to initial permeability) |
|---|---|---|---|---|
| Example 1 | 71.95 | 92.1 | 242 | 29.5% |
| Comparative Example 1 | 72.65 | 93.0 | 298 | 26.2% |
| Example 2 | 59.06 | 75.6 | 267 | 36.4% |
| Comparative Example 2 | 59.61 | 76.3 | 321 | 34.1% |

As can be seen from table 1, compared with the conventional coating process, the annular magnetic powder cores obtained in Examples 1 to 2 of the present disclosure have greatly reduced core losses, and improved DC bias performances by not less than 2%.

Example 3

100 g of sodium silicate and 100 g of deionized water were weighed and mixed uniformly and 3 g of polyoxyethylene laurylether phosphate was added thereto, and then mixed uniformly, obtaining a sodium silicate solution, in which the polyoxyethylene laurylether phosphate serves to uniformly disperse sodium silicate in an aqueous solution, and could also simultaneously play a role of antirust to prevent the metal magnetic powder from rusting. 1000 g of air-atomized sendust powder with an average particle size of 35 μm was weighed and placed into a coating furnace. The coating furnace was heated to 80° C., and then 10 g of lignosulfonate was added thereto and stirred for 30 minutes, wherein the lignosulfonate serves to uniformly disperse the metal magnetic powder. The sodium silicate solution was added to the metal magnetic powder and stirred for 30 minutes, obtaining a mixture. The coating furnace was then heated to 150° C. and the mixture was baked for 60 minutes, obtaining a coated powder. Then, aluminum oxide in an amount of 1% by weight of the coated powder and zinc stearate lubricant in an amount of 1% by weight of the coated powder were added to the coated powder, and they are mixed uniformly. The uniformly mixed magnetic powder was molded into a φ27×φ14.7×11annular magnetic powder core at a molding pressure of 2300 MPa, and chamfered. The magnetic powder core was kept at 800° C. under the protection of $N_2$ atmosphere for 90 minutes, obtaining a sodium silicate coated magnetic powder core.

Example 4

50 g of sodium silicate and 50 g of deionized water were weighed and mixed uniformly, and 0.5 g of polyoxyethylene laurylether phosphate was added thereto, and then mixed uniformly, obtaining a sodium silicate solution, in which the polyoxyethylene laurylether phosphate serves to uniformly disperse sodium silicate in an aqueous solution, and could also simultaneously play an role of antirust to prevent the metal magnetic powder from rusting. 1000 g of air-atomized sendust powder with an average particle size of 38 μm was weighed and placed into a coating furnace. The coating furnace was heated to 70° C., and 10 g of lignosulfonate was added thereto and stirred for 30 minutes, wherein the lignosulfonate serves to uniformly disperse the metal magnetic powder. The sodium silicate solution was added to the metal magnetic powder and stirred for 30 minutes, obtaining a mixture. The coating furnace was then heated to 150° C., and the mixture was baked for 60 minutes, obtaining a coated powder. Then, aluminum oxide in an amount of 1% by weight of the coated powder and zinc stearate lubricant in an amount of 0.5 % by weight of the coated powder were added to the coated powder, and they were mixed uniformly. The uniformly mixed magnetic powder was molded into a φ27×φ14.7×11annular magnetic powder core at a molding pressure of 2000 MPa, and chamfered. The magnetic: powder core was kept at 700° C. under the protection of $H_2$ atmosphere for 80 minutes, obtaining a sodium silicate coated magnetic powder core.

Comparative Example 3

An aerosolized FeSi ring magnetic powder core (φ27×φ14.7×11) prepared by a conventional coating process using an organic adhesive and phosphoric acid was used as a standard product with a permeability of 26.

Comparative Example 4

An aerosolized FeSi ring magnetic powder core (φ27×φ14.7×11) prepared by a conventional coating process using an organic adhesive and phosphoric acid was used as a standard product with a magnetic permeability of 60.

Performance Test

The annular magnetic powder cores obtained in Examples 3 to 4 and Comparative Examples 3 to 4 were subjected to winding test, using φ0.7 mm copper wire with 35 turns, in which the instrument for testing inductance was TH2816B, the instrument for testing loss was VR152, and the instrument for testing DC bias performance was CHROMO3302+1320. The obtained results are shown in Table 2.

TABLE 2

Magnetic test results of Examples 3 to 4 and Comparative Examples 3 to 4

| | Inductance (μH)/ 100 kHZ, 1 V, 25 Ts | Perme-ability | Core losses (50 kHz/ 100 mT) | DC bias performance (Ratio of permeability under 100Oe DC bias magnetic field to initial permeability) |
|---|---|---|---|---|
| Example 3 | 20.55 | 26.3 | 898 | 92.3% |
| Comparative Example 3 | 20.7 | 26.5 | 1126 | 89.7% |
| Example 4 | 47.42 | 60.7 | 608 | 73.4% |
| Comparative Example 4 | 47.58 | 60.9 | 723 | 70.2% |

As can be seen from table 2, compared with the conventional coating process, the annular magnetic powder cores obtained in Examples 3 to 4 of the present disclosure have greatly reduced core losses, and improved DC bias performance by not less than 7%.

Although embodiments of the present disclosure have been shown and described, it should be understood by those of ordinary skill in the art that various changes, modifications, substitutions and alterations may be made to the embodiments described herein without departing from the principle and spirit of the present disclosure, and the scope of the present disclosure is defined by the appended claims and equivalents thereof.

What is claimed is:

1. A method for coating a magnetic powder core with sodium silicate, comprising:

step 1, pretreatment of sodium silicate: mixing sodium silicate and deionized water in a mass ratio of 1: (1-5), adding polyoxyethylene lauryl ether phosphate thereto, and mixing uniformly to obtain a sodium silicate solution, wherein the polyoxyethylene lauryl ether phosphate serves to uniformly disperse the sodium silicate in an aqueous solution, and results in antirust that prevents the metal magnetic powder from rusting;

step 2, pretreatment of a metal magnetic powder: adding the metal magnetic powder to a coating furnace, setting the coating furnace at a temperature of 60-80° C., adding lignosulfonate to the coating furnace after reaching the set temperature, and stirring for 10-30 minutes, wherein the lignosulfonate serves to uniformly disperse the metal magnetic powder;

step 3, coating: adding the sodium silicate solution obtained in step 1 to the metal magnetic powder obtained in step 2, and stirring for 10-30 minutes, wherein the sodium silicate solution is added in an amount of 1-10 wt % of the metal magnetic powder;

step 4, baking: baking the powder obtained in step 3 at a temperature of 120-150° C. for 60-120 minutes to obtain a coated powder;

step 5, adding an insulating adhesive and a lubricant: adding an inorganic insulating adhesive in an amount of 0.1%-1% by weight of the coated powder and a stearate as a lubricant in an amount of 0.1%-1% by weight of the coated powder to the coated powder obtained in step 4, and mixing uniformly;

step 6, compression molding: subjecting the magnetic powder mixed uniformly in step 5 to a compression molding at a molding pressure of 1500-2300 MPa; and step 7, heat treatment: keeping the magnetic powder core molded in step 6 under the protection of a $N_2$ or $H_2$ atmosphere at a temperature of 600-800° C. for 30-90 minutes to obtain a sodium silicate-coated magnetic powder core.

2. The method of claim 1, wherein in step 1, the polyoxyethylene lauryl ether phosphate is added in an amount of 0.1-3 wt % of the sodium silicate.

3. The method of claim 1, wherein in step 2, the lignosulfonate is added in an amount of 0.1-1 wt % of the metal magnetic powder.

4. The method of claim 1, wherein the metal magnetic powder is one or more selected from the group consisting of pure Fe, FeSi, FeSiAl, FeSiNi, FeNi, FeNiMo, and FeSiCr, and has an average particle size of 10 to 200 μm.

5. The method of claim 1, wherein the insulating adhesive added in step 5 is one or more selected from the group consisting of silicon dioxide, aluminum oxide, and calcium oxide, and has a particle size of 10 μm or less.

6. The method of claim 1, wherein the stearate in step 5 is one or more selected from the group consisting of zinc stearate, aluminum stearate, and lithium stearate.

7. The method of claim 1, wherein a shape formed by the compression molding in step 6 is one of annular, E-shaped, and U-shaped.

8. The method of claim 1, wherein step 6 further comprises chamfering after the compression molding.

* * * * *